US012706769B2

(12) United States Patent
Silverstein et al.

(10) Patent No.: US 12,706,769 B2
(45) Date of Patent: Aug. 11, 2026

(54) LIVE METAVERSE AVATAR INFUSION FOR POST RECORDING INTERACTION

(71) Applicant: INTERNATIONAL BUSINESS MACHINES CORPORATION, Armonk, NY (US)

(72) Inventors: Zachary A. Silverstein, Georgetown, TX (US); Melanie Dauber, Oceanside, NY (US); Jeremy R. Fox, Georgetown, TX (US); Logan Bailey, Atlanta, GA (US); Jacob Ryan Jepperson, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/311,173

(22) Filed: May 2, 2023

(65) Prior Publication Data

US 2024/0372742 A1 Nov. 7, 2024

(51) Int. Cl.
*H04L 12/18* (2006.01)
*G06T 13/40* (2011.01)

(52) U.S. Cl.
CPC .......... *H04L 12/1831* (2013.01); *G06T 13/40* (2013.01); *H04L 12/1818* (2013.01); *H04L 12/1822* (2013.01)

(58) Field of Classification Search
CPC . H04L 43/0823; H04L 1/0061; H04L 43/045; H04L 43/0847; H04L 41/0631
See application file for complete search history.

(56) References Cited

U.S. PATENT DOCUMENTS

| | | | |
|---|---|---|---|
| 8,560,554 | B2 | 10/2013 | Gradin |
| 2007/0022159 | A1 | 1/2007 | Zhu |

(Continued)

FOREIGN PATENT DOCUMENTS

| | | | |
|---|---|---|---|
| AU | 2017444205 B2 | 8/2020 | |
| JP | 7063347 B2 | 9/2020 | |
| WO | 2022106829 A1 | 5/2022 | |

OTHER PUBLICATIONS

Disclosed Anonymously, "A Method to Record Conferences Through Online and Offline Collaboration", IP.com, PCOM000267057D, Sep. 21, 2021, 4 Pages.

(Continued)

*Primary Examiner* — Philip C Lee
(74) *Attorney, Agent, or Firm* — Joseph P. Curcuru

(57) ABSTRACT

An embodiment for infusing avatars into a metaverse meeting for post recording interaction is provided. The embodiment may include receiving a previously recorded metaverse meeting including interactions of participants. The embodiment may also include identifying one or more conversational elements in the previously recorded metaverse meeting. The embodiment may further include identifying one or more interactions of a primary post-meeting user with the one or more conversational elements. The embodiment may also include creating an avatar for the primary post-meeting user. The embodiment may further include updating the previously recorded metaverse meeting by integrating the created avatar for the primary post-meeting user into the previously recorded metaverse meeting. The embodiment may also include in response to determining there is no secondary post-meeting user, notifying one or more absent users who were referenced during the previously recorded metaverse meeting to input a response.

20 Claims, 3 Drawing Sheets

(56) References Cited

U.S. PATENT DOCUMENTS

| | | | |
|---|---|---|---|
| 2010/0124360 A1 | 5/2010 | Hou | |
| 2014/0222840 A1 | 8/2014 | Sanaullah | |
| 2018/0227339 A1 | 8/2018 | Rodriguez | |
| 2019/0108492 A1* | 4/2019 | Nelson | G10L 15/26 |
| 2023/0134899 A1* | 5/2023 | Biswas | H04L 12/1831<br>709/204 |

OTHER PUBLICATIONS

Disclosed Anonymously, "Disconnected Meetings", IP.com No. IPCOM000245224D, IP.com, PCOM000245224D, Feb. 18, 2016, 6 Pages.
Hanopole, "The Metaverse of Intellectual Property", https://www.ibm.com/blogs/journey-to-ai/2022/04/the-metaverse-of-intellectual property/, Apr. 25, 2022, 6 pages.
Bm, "Enterprise Video Platform and CMS", https://www.ibm.com/watson/media/internal-video-for-corporate-communications, Accessed on Mar. 17, 2023, 9 Pages.
Kue, "Posing Questions About a Recorded Meeting," IP.com, IPCOM000226876D, Apr. 23, 2013, 9 Pages.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

AVATAR INFUSION PROGRAM 150

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

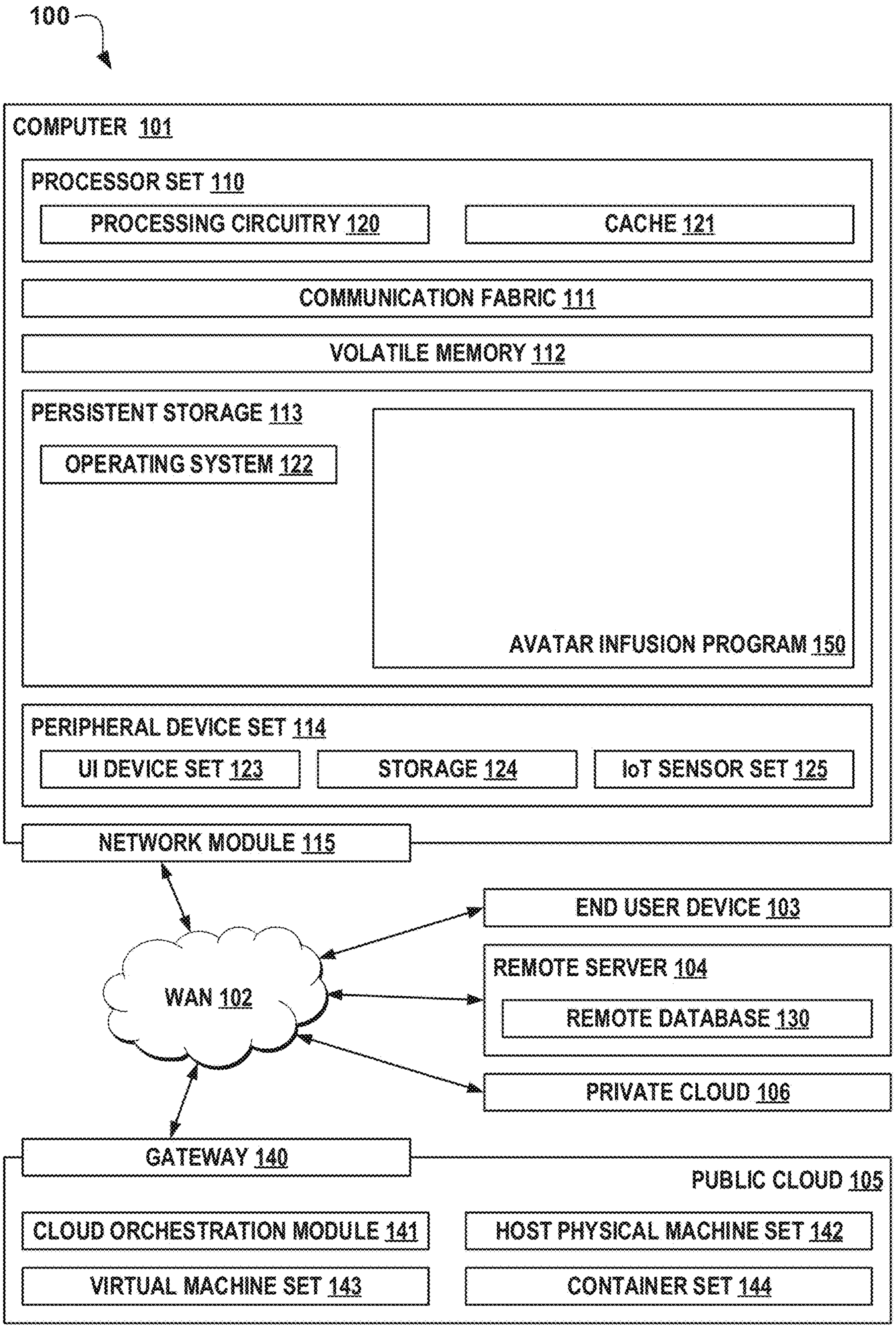

FIG. 1

LIVE METAVERSE AVATAR INFUSION FOR POST RECORDING INTERACTION

BACKGROUND

The present invention relates generally to the field of computing, and more particularly to a system for infusing avatars into a metaverse meeting for post recording interaction.

Video conferencing through a variety of desktop and mobile collaborative meeting applications, as well as collaborative meeting cloud and browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid digital transformation and globalization. Such software is extremely helpful in bridging the distance between individuals in these small and large-scale companies and allowing them to view presented content. A participant may attend a live online meeting and/or watch a recorded online meeting on demand at a later time.

SUMMARY

According to one embodiment, a method, computer system, and computer program product for infusing avatars into a metaverse meeting for post recording interaction is provided. The embodiment may include receiving a previously recorded metaverse meeting including interactions of participants. The embodiment may also include identifying one or more conversational elements in the previously recorded metaverse meeting based on an indexed transcription of the previously recorded metaverse meeting. The embodiment may further include identifying one or more interactions of a primary post-meeting user with the one or more conversational elements. The embodiment may also include creating an avatar for the primary post-meeting user based on the one or more interactions of the primary post-meeting user and a profile of the primary post-meeting user. The embodiment may further include updating the previously recorded metaverse meeting by integrating the created avatar for the primary post-meeting user into the previously recorded metaverse meeting performing the one or more interactions of the primary post-meeting user. The embodiment may also include in response to determining there is no secondary post-meeting user, notifying one or more absent users who were referenced during the previously recorded metaverse meeting to input a response.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

DETAILED DESCRIPTION

Figure 2:
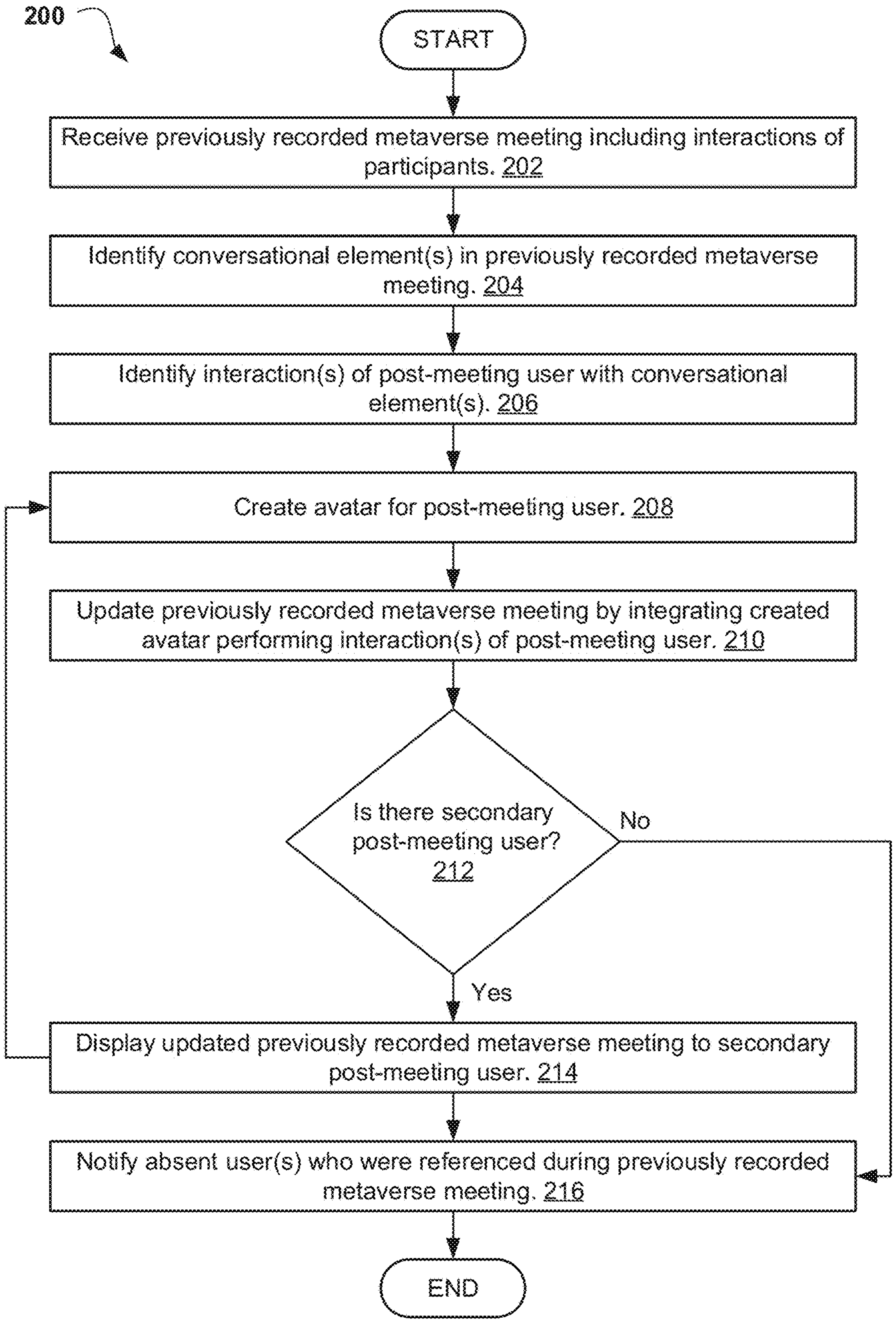
FIG. 2 illustrates an operational flowchart for infusing avatars into a metaverse meeting for post recording interaction in an avatar infusion process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for infusing avatars into a metaverse meeting for post recording interaction. The following described exemplary embodiments provide a system, method, and program product to, among other things, identify one or more interactions of a primary post-meeting user with one or more conversational elements and, accordingly, update a previously recorded metaverse meeting by integrating a created avatar into the previously recorded metaverse meeting performing the one or more interactions of the primary post-meeting user. Therefore, the present embodiment has the capacity to improve collaborative meeting technology by updating previously recorded meetings to seamlessly connect all participants who watch the meeting live and on demand.

As previously described, video conferencing through a variety of desktop and mobile collaborative meeting applications, as well as collaborative meeting cloud and browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid digital transformation and globalization. Such software is extremely helpful in bridging the distance between individuals in these small and large-scale companies and allowing them to view presented content. A participant may attend a live online meeting and/or watch a recorded online meeting on demand at a later time. The consumption of a recording by an individual leaves on demand users left out as they are not involved in the live meeting. This problem is typically addressed by updating dependent content based on conversations and discussions during the live meeting. However, updating dependent content fails to automatically update and ingest recorded meetings in the metaverse with new user collaboration that may be replayed to simulate the live meeting.

It may therefore be imperative to have a system in place to automatically update recorded meetings to simulate a live meeting environment. Thus, embodiments of the present invention may provide advantages including, but not limited to, updating previously recorded meetings to seamlessly connect all participants who watch the meeting live and on demand, enhancing the user experience in the metaverse, and enabling more productive metaverse collaborations. The present invention does not require that all advantages need to be incorporated into every embodiment of the invention.

According to at least one embodiment, when conducting a metaverse collaborative meeting, a previously recorded metaverse meeting including interactions of participants may be received in order to identify one or more conversational elements in the previously recorded metaverse meeting based on an indexed transcription of the previously recorded metaverse meeting. Upon identifying the one or more conversational elements, one or more interactions of a primary post-meeting user with the one or more conversational elements may be identified so that an avatar for the primary post-meeting user may be created based on the one or more interactions of the primary post-meeting user and a profile of the primary post-meeting user. Then, the previously recorded metaverse meeting may be updated by integrating the created avatar for the primary post-meeting user into the previously recorded metaverse meeting performing the one or more interactions of the primary post-meeting user. According to at least one embodiment, in response to determining there is no secondary post-meeting user, one or more absent users who were referenced during the previously recorded metaverse meeting may be notified to input a response.

According to at least one other embodiment, in response to determining there is the secondary post-meeting user, an iterative process may be performed, until there is no additional secondary post-meeting user, where the updated previously recorded metaverse meeting may be displayed to the secondary post-meeting user such that an avatar for the secondary post-meeting user may be created based on one or more interactions of the secondary post-meeting user and a profile of the secondary post-meeting user. Upon creating the avatar for the secondary post-meeting user, the updated previously recorded metaverse meeting may be subsequently updated by integrating the created avatar for the secondary post-meeting user into the updated previously recorded metaverse meeting performing the one or more interactions of the secondary post-meeting user in order to notify the one or more absent users who were referenced during the updated previously recorded metaverse meeting to input the response.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify one or more interactions of a primary post-meeting user with one or more conversational elements and, accordingly, update a previously recorded metaverse meeting by integrating a created avatar into the previously recorded metaverse meeting performing the one or more interactions of the primary post-meeting user.

Referring to FIG. 1, an exemplary computing environment 100 is depicted, according to at least one embodiment. Computing environment 100 contains an example of an environment for the execution of at least some of the computer code involved in performing the inventive methods, such as an avatar infusion program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the avatar infusion program 150 may be a program capable of receiving a previously recorded metaverse meeting including interactions of participants, identifying one or more interactions of a primary post-meeting user with one or more conversational elements, updating the previously recorded metaverse meeting by integrating a created avatar into the previously recorded metaverse meeting performing the one or more interactions of the primary post-meeting user, updating previously recorded meetings to seamlessly connect all participants who watch the meeting live and on demand, enhancing the user experience in the metaverse, and enabling more productive metaverse collaborations. Furthermore, notwithstanding depiction in computer 101, the electronic map engagement program 150 may be stored in and/or executed by, individually or in any combination, end user device 103, remote server 104, public cloud 105, and private cloud 106. The avatar infusion method is explained in further detail below with respect to FIG. 2. It may be appreciated that the examples described below are not intended to be limiting, and that in embodiments of the present invention the parameters used in the examples may be different.

Referring now to FIG. 2, an operational flowchart for infusing avatars into a metaverse meeting for post recording interaction in an avatar infusion process 200 is depicted according to at least one embodiment. At 202, the avatar infusion program 150 receives the previously recorded metaverse meeting including the interactions of participants. The metaverse may be a hybrid of a real-world environment and a virtual environment. As used herein, a "participant" is someone who attended a live metaverse meeting that is being recorded. Each participant may be required to opt-in to allow recording of the live metaverse meeting. Examples of the interactions of these participants may include, but are not limited to, seeking an answer to a question, providing an answer to a question, and/or otherwise engaging with a moderator or other participants. For example, while wearing an augmented reality (AR) or virtual reality (VR) headset, two or more participants may be interacting with each other.

Then, at 204, the avatar infusion program 150 identifies the one or more conversational elements in the previously recorded metaverse meeting. The one or more conversational elements are identified based on the indexed transcription of the previously recorded metaverse meeting. Once the previously recorded metaverse meeting is made available on demand and received by the avatar infusion program 150, the interactions of participants may be transcribed, indexed, and stored in a database, such as remote database 130. For example, a dialog between two or more participants in the previously recorded metaverse meeting may be transcribed and indexed.

According to at least one embodiment, the conversational element may be a pause in the previously recorded metaverse meeting. The pause may be a break in the conversation greater than time T between participant conversations. For example, where time T is five seconds, a ten second break in the conversation may be identified as a conversational element, whereas a three second break in the conversation may not be identified as a conversational element.

According to at least one other embodiment, the conversational element may be a question statement in the previously recorded metaverse meeting. The question statement may be identified based on speech-to-text processing and natural language processing (NLP) analysis using cosine similarity and grammatical analysis. For example, the phrase "What do you mean" may be identified as a question statement, and therefore a conversational element.

According to at least one further embodiment, the conversational element may be a mentioned name in the previously recorded metaverse meeting. Similar to the embodiment described above, the mentioned name may be identified based on speech-to-text processing and natural language processing (NLP) analysis using cosine similarity and grammatical analysis. For example, when a participant says, "Jake, what do you think," Jake may be identified as a mentioned name, and therefore a conversational element.

According to at least one other embodiment, the conversational element may be a keyword in the previously recorded metaverse meeting. Keywords may be identified based on an employee profile via keyword similarity analysis. For example, the employee profile of a manager Howard may indicate that Howard is tasked with evaluating code quality. Continuing the example, any discussion in the previously recorded metaverse meeting relating to code quality may be identified as a keyword and associated with Howard.

In the present embodiment, the one or more conversational elements in the previously recorded metaverse meeting may be annotated with metadata describing a time at which the one or more conversational elements occurs in the previously recorded metaverse meeting. The timestamp may also be indexed. For example, the ten second break in the conversation may occur between the 5:00 minute mark and the 5:10 minute mark. In another example, the mentioned name Jake may occur at the 7:00 minute mark.

Next, at 206, the avatar infusion program 150 identifies the one or more interactions of the primary post-meeting user with the one or more conversational elements. As used herein, the "primary post-meeting user" is a first person to watch the previously recorded metaverse meeting (i.e., after the live metaverse meeting has concluded). While watching the previously recorded metaverse meeting, the primary post-meeting user may perform the one or more interactions with the one or more conversational elements. Examples of the interaction may include, but are not limited to, speaking, text input, eye movement, and/or bodily movement (e.g., hand and/or finger gestures).

For example, a primary post-meeting user Jeremy is supposed to join a scrum team within the metaverse, but due to a schedule conflict won't be able to attend the meeting live. However, Jeremy may still want to have a dynamic experience with fellow team members. Accordingly, Jeremy may speak during the pause in the previously recorded metaverse meeting. Jeremy may also speak to respond when Jeremy's name is invoked and/or when a question is asked by another team member. Additionally, Jeremy may raise a hand and/or point toward an object when Jeremy's name is invoked and/or when a question is asked by another team member.

Then, at 208, the avatar infusion program 150 creates the avatar for the primary post-meeting user. The avatar is created based on the one or more interactions of the primary post-meeting user and the profile of the primary post-meeting user. In order to create the avatar, the avatar infusion program 150 may gather information from the profile of the primary post-meeting user. Such information about the primary post-meeting user contained in the profile may include, but is not limited to, gender, age, height, tone of voice, and any other characteristics about the primary post-meeting user that may be utilized in creating the avatar.

The created avatar for the primary post-meeting user may perform the same one or more interactions as the primary post-meeting user on which the created avatar is based, described in further detail below with respect to step 210.

Next, at 210, the avatar infusion program 150 updates the previously recorded metaverse meeting. The previously recorded metaverse meeting is updated by integrating the created avatar for the primary post-meeting user into the previously recorded metaverse meeting performing the one or more interactions of the primary post-meeting user. The one or more interactions performed by the created avatar for the primary post-meeting user in the updated previously recorded metaverse meeting may include an identical speech and bodily movement that are performed by the primary post-meeting user in the real-world environment.

For example, the primary post-meeting user Jeremy may speak during the pause in the previously recorded metaverse meeting. Additionally, Jeremy may also speak to respond when Jeremy's name is invoked and/or when a question is asked by another team member. The created avatar for Jeremy that is integrated into the previously recorded metaverse meeting may speak the identical words that Jeremy speaks in the real-world environment. Furthermore, Jeremy may raise a hand and/or point toward an object when Jeremy's name is invoked and/or when a question is asked by another team member. The created avatar for Jeremy that is integrated into the previously recorded metaverse meeting may raise the hand and/or point toward the object in the same manner that Jeremy made these bodily movements in the real-world environment. Thus, the avatar may be a context-aware avatar that is integrated into the previously recorded metaverse meeting dynamically.

According to at least one embodiment, the created avatar may perform the one or more interactions in the previously recorded metaverse meeting at the same time the one or more interactions are performed by the primary post-meeting user in the real-world environment. For example, where Jeremy speaks between the 3:00 minute mark and the 3:05 minute mark, the created avatar for Jeremy may also speak between the 3:00 minute mark and the 3:05 minute mark.

According to at least one other embodiment, the created avatar may perform the one or more interactions in the previously recorded metaverse meeting at a contextually appropriate time based on the annotated one or more conversational elements, described above with respect to step 204. The contextually appropriate time may be during a pause in the previously recorded metaverse meeting and/or immediately after the one or more conversational elements so as not to interfere with the interactions of other participants. For example, where the ten second break in the conversation occurs between the 5:00 minute mark and the 5:10 minute mark, the created avatar for Jeremy may also speak between the 5:00 minute mark and the 5:10 minute mark, assuming the context is appropriate. In another example, the mentioned name Jeremy may occur at the 7:00 minute mark. In this example, the created avatar for Jeremy may raise the hand at the 7:02 minute mark.

Then, at 212, the avatar infusion program 150 determines whether there is the secondary post meeting user. As used herein, the "secondary post-meeting user" is a subsequent person to watch the previously recorded metaverse meeting after the previously recorded metaverse meeting has been updated (i.e., after the one or more interactions of the primary post-meeting user have been incorporated into the previously recorded metaverse meeting).

In response to determining there is the secondary post-meeting user (step 212, "Yes" branch), the avatar infusion process 200 proceeds to step 214 to display the updated previously recorded metaverse meeting to the secondary post-meeting user. In response to determining there is no secondary post-meeting user (step 212, "No" branch), the avatar infusion process 200 proceeds to step 216 to notify the one or more absent users who were referenced during the previously recorded metaverse meeting to input the response.

Next, at 214, the avatar infusion program 150 displays the updated previously recorded metaverse meeting to the secondary post-meeting user. It may be appreciated that in embodiments of the present invention, the updated previously recorded metaverse meeting that is displayed to the secondary post-meeting user includes the content from the previously recorded metaverse meeting in addition to the one or more interactions of the primary post-meeting user as performed by the created avatar of the primary post-meeting user.

While watching the updated previously recorded metaverse meeting, the secondary post-meeting user may perform one or more interactions with the one or more conversational elements. Examples of the interaction performed by the secondary post-meeting user may include, but are not limited to, speaking, text input, eye movement, and/or bodily movement (e.g., hand and/or finger gestures).

For example, a secondary post-meeting user Melanie is supposed to join the scrum team within the metaverse, but due to a schedule conflict also won't be able to attend the meeting live. However, Melanie may still want to have a dynamic experience with fellow team members. Accordingly, Melanie may speak during the pause in the previously recorded metaverse meeting. Melanie may also speak to respond when Melanie's name is invoked and/or when a question is asked by another team member. Additionally, Melanie may raise a hand and/or point toward an object when Melanie's name is invoked and/or when a question is asked by another team member.

It may be appreciated that in embodiments where there is the secondary user, steps 208-214 may be iterated until there is no additional secondary post-meeting user. The avatar for the secondary post-meeting user may be created in the same manner described above with respect to step 208. Specifically, the avatar for the secondary post-meeting user may be created based on the one or more interactions of the secondary post-meeting user and a profile of the secondary post-meeting user. The updated previously recorded metaverse meeting may be subsequently updated by integrating the created avatar for the secondary post-meeting user into the updated previously recorded metaverse meeting (i.e., from step 210), where the created avatar for the secondary post-meeting user performs the one or more interactions that the secondary post-meeting user performs in the real-world environment. It may also be appreciated that in embodiments of the present invention, the subsequently updated previously recorded metaverse meeting that is displayed to any additional secondary post-meeting user after the secondary post-meeting user includes the content from the previously recorded metaverse meeting, the updated previously recorded metaverse meeting, and the one or more interactions of the secondary post-meeting user as performed by the created avatar of the secondary post-meeting user. In this manner, the one or more interactions of any post-meeting user may be incrementally and cumulatively added to the original previously recorded metaverse meeting, appearing as if the post-meeting users attended the live metaverse meeting.

Then, at 216, the avatar infusion program 150 notifies the one or more absent users who were referenced during the previously recorded metaverse meeting to input the response. As used herein, the "absent user" is any user other than the primary post-meeting user and the secondary post-meeting user who did not participate in the live metaverse meeting. For example, when a participant says, "Jake, what do you think," Jake may be absent from the live metaverse meeting. In this example, Jake may be notified (e.g., on a smartphone or other device) to input the response. Continuing the example, when Jake inputs the response, the response may be integrated into the previously recorded metaverse meeting in the same manner described above with respect to step 210.

According to at least one embodiment, notifying the one or more absent users who were referenced may include notifying each participant that the previously recorded metaverse meeting includes additional content. As described above with respect to step 202, the participant is someone who attended the live metaverse meeting that is being recorded. For example, where Robert attended the live metaverse meeting. Robert may be notified that the previously recorded metaverse meeting includes the additional content. Furthermore, the additional content may include the response of the one or more absent users described above. In this manner, the live viewers of the metaverse meeting may also be able to view the one or more interactions of any post-meeting user and/or any absent user.

According to at least one other embodiment, where there is the secondary post-meeting user, the one or more absent users who were referenced during the updated previously recorded metaverse meeting may be notified to input a response. For example, the secondary post-meeting user Melanie may ask Tom a question, but Tom may be absent from the previously recorded metaverse meeting. In this example, Tom may be notified (e.g., on a smartphone or other device) to input the response. Continuing the example, when Tom inputs the response, the response may be integrated into the updated previously recorded metaverse meeting in the same manner described above with respect to step 210.

Figure 3:
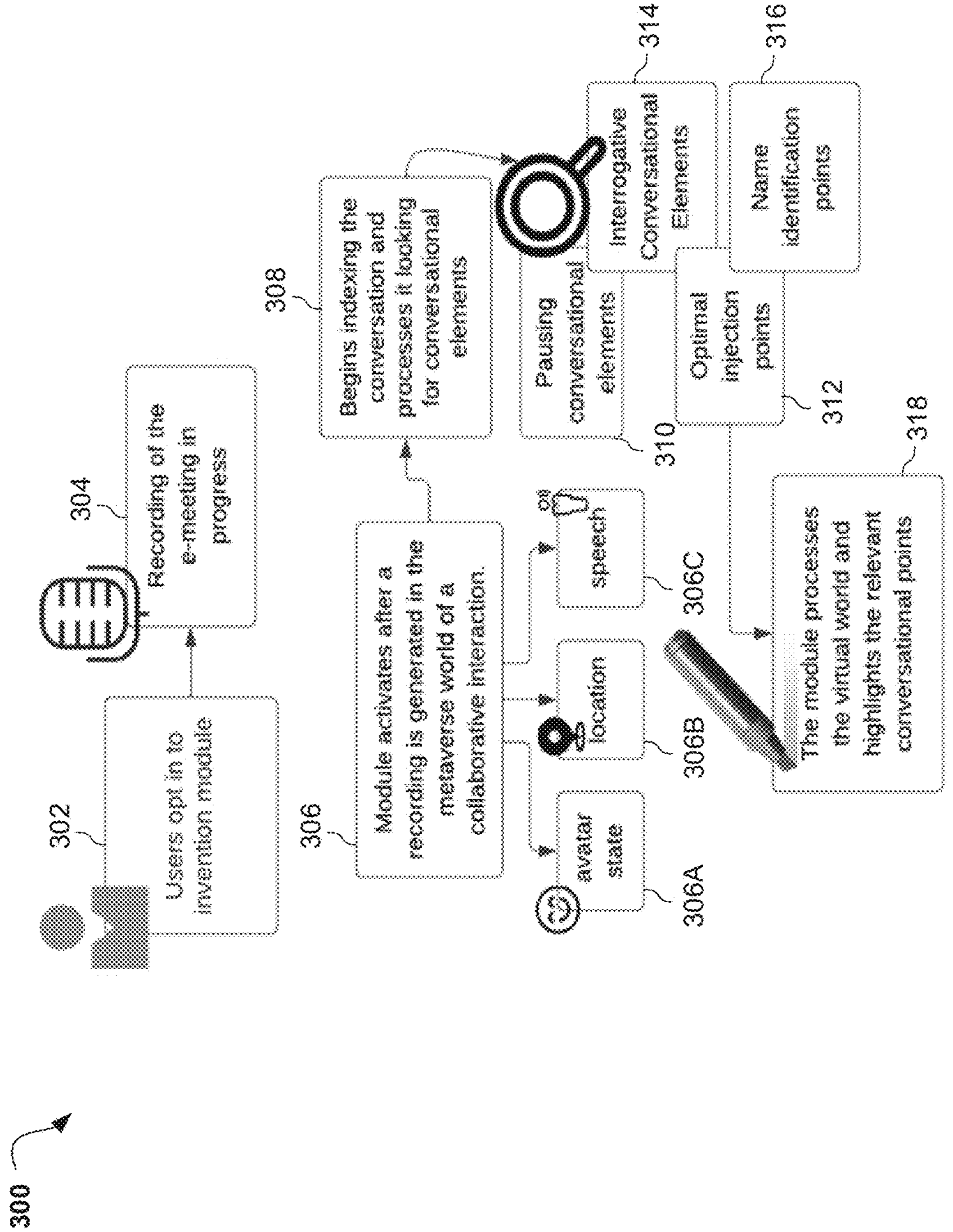
FIG. 3 is an exemplary diagram depicting an interaction between solution components of the process in FIG. 2 according to at least one embodiment.

Referring now to FIG. 3, an exemplary diagram 300 depicting an interaction between solution components of the process in FIG. 2 is shown according to at least one embodiment. In the diagram 300, an opt-in module 302 receives the opt-in from the participants in the live metaverse meeting to allow a recoding module 304 to record the live metaverse meeting. The opt-in module 302 and the recording module 304 may serve as prerequisites of the avatar infusion process 200 (FIG. 2). An avatar infusion activation module 306 may commence the avatar infusion process 200 (FIG. 2). The avatar infusion activation module 306 may identify an avatar state 306A of the users, a location 306B in which the previously recorded metaverse meeting takes place, and speech 306C during the previously recorded metaverse meeting. An index module 308 may begin indexing and transcribing the previously recorded metaverse meeting. The index module 308 may identify pausing conversational elements 310, optimal injection points 312, interrogative conversational elements 314, and/or name identification points 316. A processing module 318 may then highlight the pausing conversational elements 310, optimal injection points 312, interrogative conversational elements 314, and/or name identification points 316 in the previously recorded metaverse meeting with metadata describing the time at which these conversational elements 310, 312, 314, 316 occurs in the previously recorded metaverse meeting.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of infusing avatars into a metaverse meeting for post recording interaction, the method comprising:

receiving a previously recorded metaverse meeting including interactions of participants;

identifying one or more conversational elements in the previously recorded metaverse meeting based on an indexed transcription of the previously recorded metaverse meeting;

identifying one or more interactions of a primary post-meeting user with the one or more conversational elements;

creating an avatar for the primary post-meeting user based on the one or more interactions of the primary post-meeting user and a profile of the primary post-meeting user;

updating the previously recorded metaverse meeting by integrating the created avatar for the primary post-meeting user into the previously recorded metaverse meeting performing the one or more interactions of the primary post-meeting user;

determining whether there is a secondary post-meeting user; and in response to determining there is no secondary post-meeting user:

notifying one or more absent users who were referenced during the previously recorded metaverse meeting to input a response.

2. The computer-based method of claim 1, further comprising:

in response to determining there is the secondary post-meeting user, iterating, until there is no additional secondary post-meeting user:

displaying the updated previously recorded metaverse meeting to the secondary post-meeting user;

creating an avatar for the secondary post-meeting user based on one or more interactions of the secondary post-meeting user and a profile of the secondary post-meeting user;

subsequently updating the updated previously recorded metaverse meeting by integrating the created avatar for the secondary post-meeting user into the updated previously recorded metaverse meeting performing the one or more interactions of the secondary post-meeting user; and notifying the one or more absent users who were referenced during the updated previously recorded metaverse meeting to input the response.

3. The computer-based method of claim 1, wherein notifying the one or more absent users who were referenced further comprises:

notifying each participant that the previously recorded metaverse meeting includes additional content.

4. The computer-based method of claim 3, wherein the additional content includes the response of the one or more absent users.

5. The computer-based method of claim 1, wherein the one or more interactions performed by the created avatar for the primary post-meeting user in the updated previously recorded metaverse meeting include an identical speech and bodily movement performed by the primary post-meeting user in a real-world environment.

6. The computer-based method of claim 1, wherein the one or more conversational elements in the previously recorded metaverse meeting are annotated with metadata describing a time at which the one or more conversational elements occurs in the previously recorded metaverse meeting.

7. The computer-based method of claim 1, wherein the conversational element is selected from a group consisting of a pause in the previously recorded metaverse meeting, a question statement in the previously recorded metaverse meeting, a mentioned name in the previously recorded metaverse meeting, and a keyword in the previously recorded metaverse meeting.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving a previously recorded metaverse meeting including interactions of participants;

identifying one or more conversational elements in the previously recorded metaverse meeting based on an indexed transcription of the previously recorded metaverse meeting;

identifying one or more interactions of a primary post-meeting user with the one or more conversational elements;

creating an avatar for the primary post-meeting user based on the one or more interactions of the primary post-meeting user and a profile of the primary post-meeting user;

updating the previously recorded metaverse meeting by integrating the created avatar for the primary post-meeting user into the previously recorded metaverse meeting performing the one or more interactions of the primary post-meeting user;

determining whether there is a secondary post-meeting user; and in response to determining there is no secondary post-meeting user:

notifying one or more absent users who were referenced during the previously recorded metaverse meeting to input a response.

9. The computer system of claim 8, the method further comprising:

in response to determining there is the secondary post-meeting user, iterating, until there is no additional secondary post-meeting user:

displaying the updated previously recorded metaverse meeting to the secondary post-meeting user;

creating an avatar for the secondary post-meeting user based on one or more interactions of the secondary post-meeting user and a profile of the secondary post-meeting user;

subsequently updating the updated previously recorded metaverse meeting by integrating the created avatar for the secondary post-meeting user into the updated previously recorded metaverse meeting performing the one or more interactions of the secondary post-meeting user; and notifying the one or more absent users who were referenced during the updated previously recorded metaverse meeting to input the response.

10. The computer system of claim 8, wherein notifying the one or more absent users who were referenced further comprises:

notifying each participant that the previously recorded metaverse meeting includes additional content.

11. The computer system of claim 10, wherein the additional content includes the response of the one or more absent users.

12. The computer system of claim 8, wherein the one or more interactions performed by the created avatar for the primary post-meeting user in the updated previously recorded metaverse meeting include an identical speech and bodily movement performed by the primary post-meeting user in a real-world environment.

13. The computer system of claim 8, wherein the one or more conversational elements in the previously recorded metaverse meeting are annotated with metadata describing a time at which the one or more conversational elements occurs in the previously recorded metaverse meeting.

14. The computer system of claim 8, wherein the conversational element is selected from a group consisting of a pause in the previously recorded metaverse meeting, a question statement in the previously recorded metaverse meeting, a mentioned name in the previously recorded metaverse meeting, and a keyword in the previously recorded metaverse meeting.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving a previously recorded metaverse meeting including interactions of participants;

identifying one or more conversational elements in the previously recorded metaverse meeting based on an indexed transcription of the previously recorded metaverse meeting;

identifying one or more interactions of a primary post-meeting user with the one or more conversational elements;

creating an avatar for the primary post-meeting user based on the one or more interactions of the primary post-meeting user and a profile of the primary post-meeting user;

updating the previously recorded metaverse meeting by integrating the created avatar for the primary post-meeting user into the previously recorded metaverse meeting performing the one or more interactions of the primary post-meeting user;

determining whether there is a secondary post-meeting user; and in response to determining there is no secondary post-meeting user:

notifying one or more absent users who were referenced during the previously recorded metaverse meeting to input a response.

16. The computer program product of claim 15, the method further comprising:

in response to determining there is the secondary post-meeting user, iterating, until there is no additional secondary post-meeting user:

displaying the updated previously recorded metaverse meeting to the secondary post-meeting user;

creating an avatar for the secondary post-meeting user based on one or more interactions of the secondary post-meeting user and a profile of the secondary post-meeting user;

subsequently updating the updated previously recorded metaverse meeting by integrating the created avatar for the secondary post-meeting user into the updated previously recorded metaverse meeting performing the one or more interactions of the secondary post-meeting user; and notifying the one or more absent users who were referenced during the updated previously recorded metaverse meeting to input the response.

17. The computer program product of claim 15, wherein notifying the one or more absent users who were referenced further comprises:

notifying each participant that the previously recorded metaverse meeting includes additional content.

18. The computer program product of claim 17, wherein the additional content includes the response of the one or more absent users.

19. The computer program product of claim 15, wherein the one or more interactions performed by the created avatar for the primary post-meeting user in the updated previously recorded metaverse meeting include an identical speech and bodily movement performed by the primary post-meeting user in a real-world environment.

20. The computer program product of claim 15, wherein the one or more conversational elements in the previously recorded metaverse meeting are annotated with metadata describing a time at which the one or more conversational elements occurs in the previously recorded metaverse meeting.

* * * * *